US009423604B2

(12) United States Patent
Dugan et al.

(10) Patent No.: US 9,423,604 B2
(45) Date of Patent: Aug. 23, 2016

(54) SUBSURFACE GLASS RETICLES

(71) Applicant: Translume, Inc., Ann Arbor, MI (US)

(72) Inventors: Mark A. Dugan, Ann Arbor, MI (US); Ali Said, Ann Arbor, MI (US)

(73) Assignee: TRANSLUME, INC, Ann Arbor, MI (US)

( * ) Notice: Subject to any disclaimer, the term of this patent is extended or adjusted under 35 U.S.C. 154(b) by 350 days.

(21) Appl. No.: 13/974,688

(22) Filed: Aug. 23, 2013

(65) Prior Publication Data

US 2013/0342903 A1    Dec. 26, 2013

Related U.S. Application Data

(62) Division of application No. 12/707,638, filed on Feb. 17, 2010, now Pat. No. 8,541,713.

(51) Int. Cl.
| | |
|---|---|
| *G02B 23/14* | (2006.01) |
| *F41G 1/00* | (2006.01) |
| *F41G 3/06* | (2006.01) |
| *B23K 26/00* | (2014.01) |
| *B23K 103/00* | (2006.01) |

(52) U.S. Cl.
CPC ............ *G02B 23/14* (2013.01); *B23K 26/0006* (2013.01); *B23K 26/0057* (2013.01); *F41G 1/00* (2013.01); *F41G 3/06* (2013.01); *B23K 2203/50* (2015.10)

(58) Field of Classification Search
CPC .............. F41G 1/00; F41G 1/32; F41G 1/38; F41G 1/345; F41G 3/06; G02B 23/14
USPC ......... 359/428, 493.01, 486.01; 42/111, 119, 42/122, 123, 130–132
See application file for complete search history.

(56) References Cited

U.S. PATENT DOCUMENTS

| | | | |
|---|---|---|---|
| 6,768,850 B2 | 7/2004 | Dugan et al. | |
| 7,294,454 B1 | 11/2007 | Said et al. | |
| 7,391,947 B1 | 6/2008 | Bado et al. | |
| 2002/0023903 A1 | 2/2002 | Ann Ngoi et al. | |
| 2003/0189031 A1* | 10/2003 | Troitski ............ | B23K 26/0039 219/121.69 |
| 2008/0165406 A1* | 7/2008 | Galun ................... | G02B 27/32 359/237 |
| 2008/0186570 A1* | 8/2008 | Stenton ................... | F41G 1/345 359/428 |
| 2010/0025387 A1 | 2/2010 | Arai et al. | |
| 2011/0194167 A1* | 8/2011 | Jackson ................. | G02B 27/01 359/290 |

OTHER PUBLICATIONS

U.S. Appl. No. 61/271,284, filed Jul. 2009, Jackson; Jeanette Elisabeth.*
Non-Final Office Action in U.S. Appl. No. 12/707,638, 6 pages, Jan. 7, 2013.
Taylor et al., "Applications of Femtosecond Laser Induced Self-Organized Planar Nanocracks Inside Fused Silica Glass", Laser & Photon, Jan. 17, 2008, pp. 24-46, Rev. 2, No. 1-2.
Taylor et al., "Femtosecond Laser Erasing and Rewriting of Self-Organized Planar Nanocracks in Fused Silica Glass", Optics Letters, Oct. 1, 2007, pp. 2888-2890, vol. 32, No. 19.

* cited by examiner

*Primary Examiner* — Thomas K Pham
*Assistant Examiner* — Mitchell Oestreich
(74) *Attorney, Agent, or Firm* — Lempia Summerfield Katz LLC

(57) ABSTRACT

An optical instrument for light incoming along a principal optical axis includes a glass block and a subsurface object within the glass block. The subsurface object includes an arrangement of object marks. Each object mark includes a plurality of scattering layers stacked against the principal optical axis of the incoming light. First and second scattering layers of the plurality of scattering layers have different polarization responses.

20 Claims, 8 Drawing Sheets

SUBSURFACE GLASS RETICLES

CROSS-REFERENCE TO RELATED APPLICATION

This application is a divisional of U.S. application Ser. No. 12/707,638, entitled "Subsurface Glass Reticles" and filed on Feb. 17, 2010, the entire disclosure of which is hereby incorporated by reference.

STATEMENT REGARDING FEDERALLY SPONSORED RESEARCH OR DEVELOPMENT

This invention was made with government support under Contract No. W15QKN-10-C-0002 awarded by the U.S. Army. The government has certain rights in the invention.

BACKGROUND OF THE DISCLOSURE

1. Field of the Disclosure

The disclosure relates generally to laser-based fabrication of subsurface objects in glass and, more particularly, to subsurface sight reticles.

2. Brief Description of Related Technology

Creation of a three-dimensional object inside a glass substrate (i.e. a subsurface object) is becoming a common fabrication procedure. Systems have been developed to produce three-dimensional objects in souvenir "crystals" or like items. A number of companies offer custom-made souvenirs by using a three-dimensional photograph as the basis for subsurface formation of an object capable of producing an image of the photograph for a person looking at the crystal.

The objects in these inexpensive commercial items are typically created using nanosecond laser pulses. The resulting quality of the designs and images varies greatly between vendors, but in all cases images of the objects are visible due to the presence of relatively large laser-created scattering centers. Light, diffusing from the surroundings or from a punctual source, is deflected by the scattering centers into the eyes of the person viewing the object. The image appears to be brighter than the rest of the glass block, because the unaltered glass surrounding the object does not scatter light towards the viewer.

Other subsurface objects have been created through the use of a mixed composition glass that changes its color when exposed to proper laser illumination. Some glasses form such "color centers" when exposed to the proper excitation. These color centers can block incoming visible light. This phenomenon has been used to create subsurface objects in a block of mixed glass. Unlike the previously described approach, images of these objects are visible because the incoming light is absorbed by the color center (rather than scattered). Unfortunately, color centers generally have a limited lifetime, especially when exposed to higher temperatures. While special glass treatments or glass compositions can reduce this short lifetime drawback, fused silica or fused quartz does not form significantly visible color centers.

Ultrashort laser pulses have also been used to create smaller scattering centers (relative to those obtained with nanosecond pulses) and, thus, create finer imagery. However, these smaller scattering centers are not as efficient at scattering light. As a result, ultrashort pulses are typically not used for artistic applications. Instead, ultrashort pulses are commonly used when it is desirable to generate a weak or concealed marking when, for example, discreetly marking an item can help to prevent counterfeit reproductions.

SUMMARY OF THE DISCLOSURE

In accordance with one aspect of the disclosure, an optical instrument for light incoming along a principal optical axis includes a glass block and a subsurface object within the glass block. The subsurface object includes an arrangement of object marks, each object mark including a plurality of scattering layers stacked against the principal optical axis of the incoming light. First and second scattering layers of the plurality of scattering layers have different polarization responses.

Each of the plurality of scattering layers may be configured such that each object mark exhibits no polarization dependence. Each scattering layer may include a set of parallel intrinsic scattering tracks, each intrinsic scattering track being oriented transverse to the principal optical axis and exhibiting a polarization dependence.

In some cases, the optical instrument further includes an array of intrinsic waveguides disposed within the glass block, the array being configured to diffuse any light not scattered by the plurality of scattering layers.

The subsurface object may be disposed along a non-flat surface within the glass block. Alternatively or additionally, the glass block may have a non-flat surface through which the light passes.

The optical instrument may further include a shell enclosing the glass block. The optical instrument may then further include a light source configured to introduce side-illumination within the shell and an illumination scattering layer disposed within the glass block and positioned to redirect the side-illumination from the light source along the principal optical axis. The illumination scattering layer may have a spatially defined pattern that corresponds with the arrangement of object marks. Alternatively or additionally, the illumination scattering layer includes a set of intrinsic scattering tracks, at least one of which includes discontinuities to reduce a density of the scattering layer.

The arrangement of object marks may form a reticle.

In accordance with another aspect of the disclosure, an optical instrument for light incoming along a principal optical axis includes an enclosure having an opening through which the incoming light passes to allow propagation along the principal optical axis, a glass block housed within the enclosure, and a subsurface reticle within the glass block. The subsurface reticle includes an arrangement of reticle marks, each reticle mark including an array of intrinsic waveguides. The array of intrinsic waveguides is configured to diffuse the incoming light from the principal optical axis.

Each intrinsic waveguide may be oriented in parallel with the principal optical axis. Alternatively or additionally, at least one of the waveguides may have a tip bent outward to direct the incoming light away from the principal optical axis.

Each reticle mark may further include a plurality of scattering layers, each scattering layer including an intrinsic region of modified refractive index oriented transverse to the principal optical axis. Each intrinsic region includes a void. First and second layers of the plurality of scattering layers may have different polarization responses.

The optical instrument may further include an optical element having a numerical aperture smaller than a numerical aperture of the array of intrinsic waveguides.

The subsurface reticle may be disposed along a non-flat surface within the glass block. Alternatively or additionally, the glass block may have a non-flat surface through which the light passes.

In accordance with yet another aspect of the disclosure, a method of fabricating a reticle for a telescope sight includes the steps of directing ultrashort laser pulses toward a glass block, and forming a subsurface object within the glass block, the subsurface object having a plurality of intrinsic scattering layers. The forming step includes selecting a polarization state of the ultrashort laser pulses to vary a polarization dependence of the subsurface object over the plurality of intrinsic scattering layers.

The forming step may include writing the first intrinsic scattering layer within the glass block with the ultrashort laser pulses in a first polarization state, and writing the second intrinsic scattering layer within the glass block with the ultrashort laser pulses in a second polarization state. Alternatively, the forming step may include writing a set of parallel tracks within each intrinsic scattering layer, and varying the polarization state of the ultrashort laser while writing of each track.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

Figure 7:
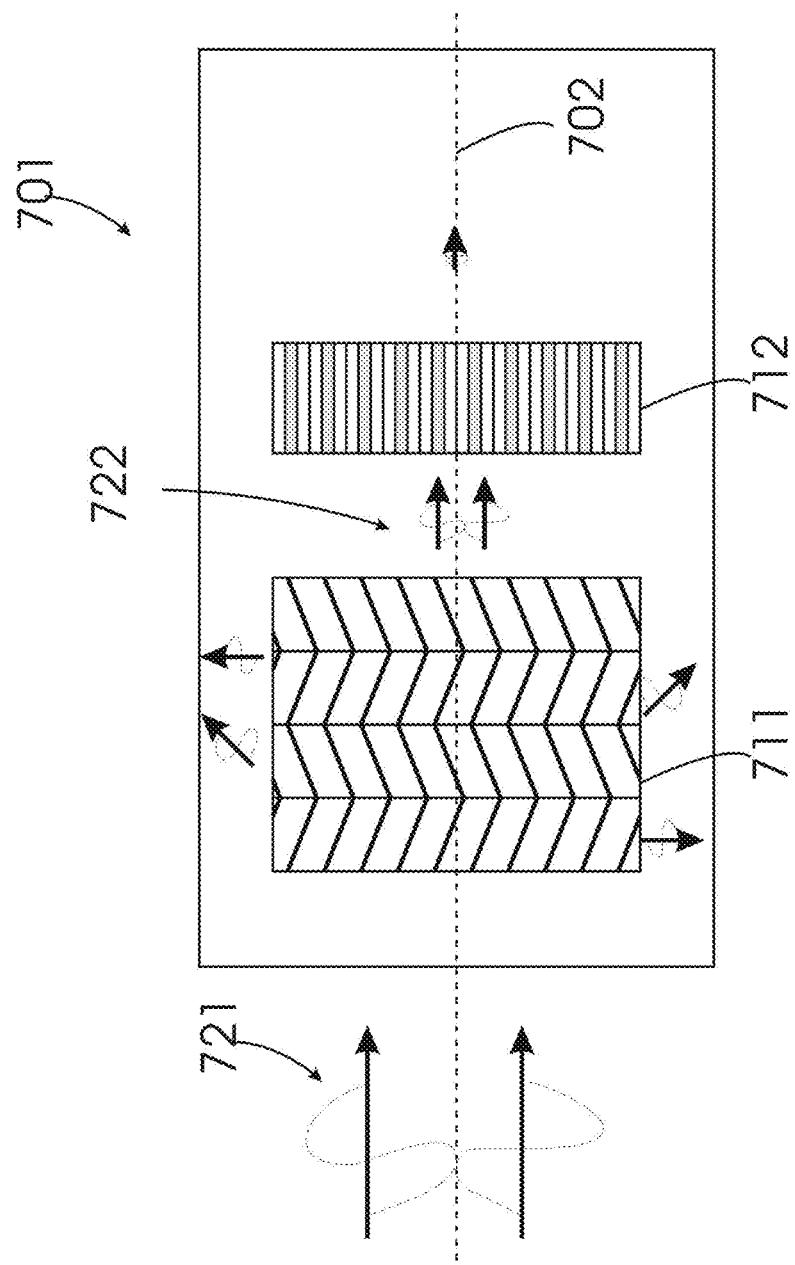
Figure 8:
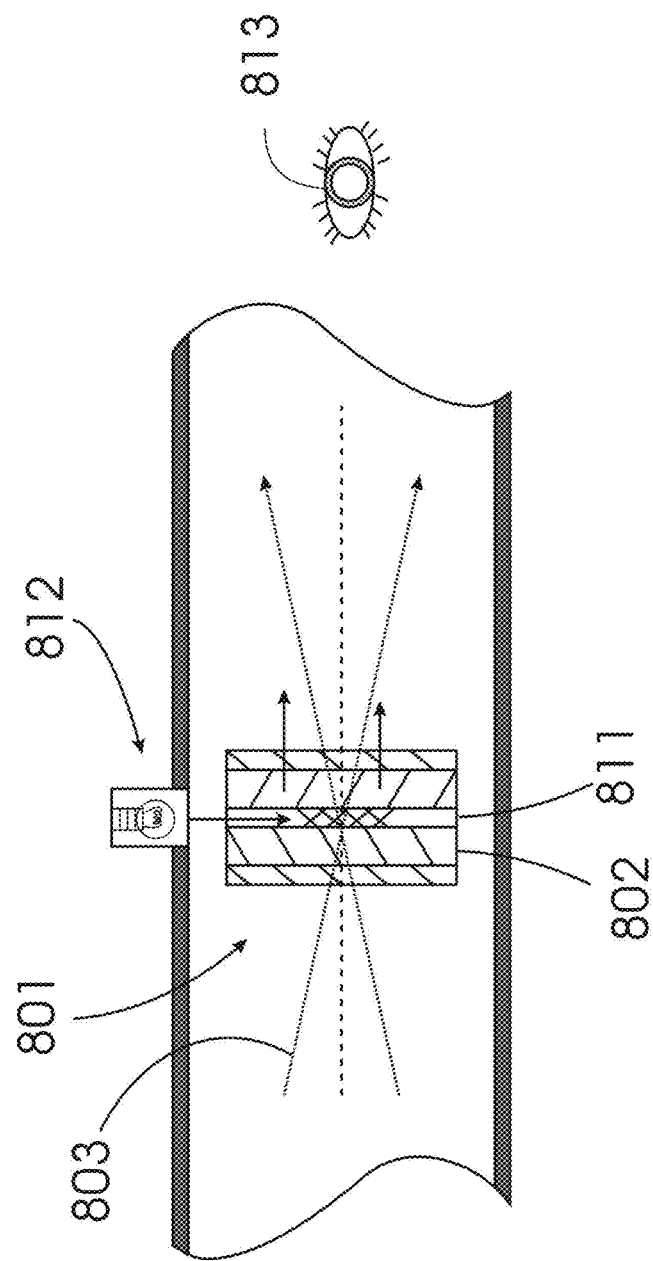

FIG. 7 is a schematic illustration of yet another exemplary subsurface object mark constructed in accordance with an embodiment having both a stack of scattering layers and an array of waveguides to scatter or divert the incoming light; and, FIG. 8 is a schematic illustration of an exemplary subsurface object mark or scattering center having a multilayered construction for polarization-insensitive operation and an illuminated layer configured for night operation.

While the disclosed reticles and optical instruments are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF THE DISCLOSURE

The invention generally relates to subsurface reticles and other objects in glass blocks for weapon sights and other optical instruments. Methods of fabricating the reticles in the glass blocks are also described. The disclosed reticles may be useful in a variety of contexts and applications, including, for instance, sights for advanced weapons and weapon systems. Notwithstanding the description of the disclosed reticles in connection with weapon sights, the disclosed reticles are not limited to weapon or weapon sight applications, and instead may be incorporated into a variety of other optical instruments, including, for instance, telescopes, photomasks, microfluidic chips, microscopes, etc.

Currently, weapon sight reticles are typically fabricated only on a flat glass surface via etch/fill or metal deposition techniques. When the flat surface resides in a focal plane, the surface accordingly produces backward reflections, increasing the possibility of detection of the optical instrument (or weapon) into which the reticle is incorporated. These signatures have been reduced by cementing a cover plate to the reticle substrate with index matching cement applied to the reticle substrate surface. Unfortunately, the index match is usually imperfect over the light spectrum due to a mismatch in the dispersion of the glass and the cement.

The disclosed reticles and fabrication methods avoid these and other complications by forming the reticle within the bulk of a glass substrate rather than etching or otherwise forming the reticle on the glass surface. In so doing, the disclosed subsurface reticles can provide reduced reflection signatures (i.e., lower possibility of instrument detection), reduced assembly requirements, reduced parallax, and improved optical system design flexibility. For example, the surface of the glass substrate no longer needs to be flat, and may instead be shaped to promote various optical effects, as desired.

Weapon sights present a number of unique challenges relative to the inexpensive souvenir items addressed above. With the souvenir items, the amount of light scattered and the direction of the scattering is a function of the incoming light polarization. This characteristic is usually, if not always, not a significant or severe issue because the surrounding light is generally mostly unpolarized. Moreover, a variance in visibility as a function of the incoming light polarization is not perceived as a significant problem for souvenir and other kinds of artistic applications. When applied to weapon sights, however, this polarization dependence can be especially troublesome if, for example, the weapon is used at dawn or dusk, or during other periods of polarized light. As described below, the disclosed reticles and fabrication techniques address this shortcoming to enable the weapon sight to function consistently as intended regardless of the polarization state of the incoming light.

Other challenges involve the circumstances in which a weapon sight reticle is used. Generally speaking, a weapon sight reticle is used in a specific, well-defined geometry. The reticle is inserted inside an optical instrument, such as a telescope or the like. The reticle is located within one of the focal planes of the optical instrument, as described and shown in connection with FIG. 2. The reticle is viewed within a limited numerical aperture. For daylight operations, the target is typically located in the far-field, on-axis with the weapon sight (i.e., there is a straight optical path going from the target, through the optical instrument, through the reticle, to the eye of the user (or to some type of detector (e.g., CCD, night vision amplifier, etc.). For night operations, the reticle may be illuminated from a small source associated with the optical instrument. The system may operate in the visible or at other wavelengths. These and other aspects of weapon sight reticles present challenges addressed by the subsurface glass reticles described herein.

As described below, the disclosed reticles may be formed in a variety of different glass materials, including fused silica (or fused quartz) and various mixed glass compositions that do not form significant amount of color centers when exposed to intense light. Color centers may be undesirable for weapon sight applications, insofar as the reticle or, more generally, the instrument may be subjected to elevated temperatures for extended periods, or may be stored for extended time (e.g., multiyear) periods. These conditions are likely to fully or partially erase reticles formed by color centers. Furthermore, some applications involve use of the weapon sight at night, and visibility of a reticle at night may be difficult to achieve with color center-based markings.

Figure 1:
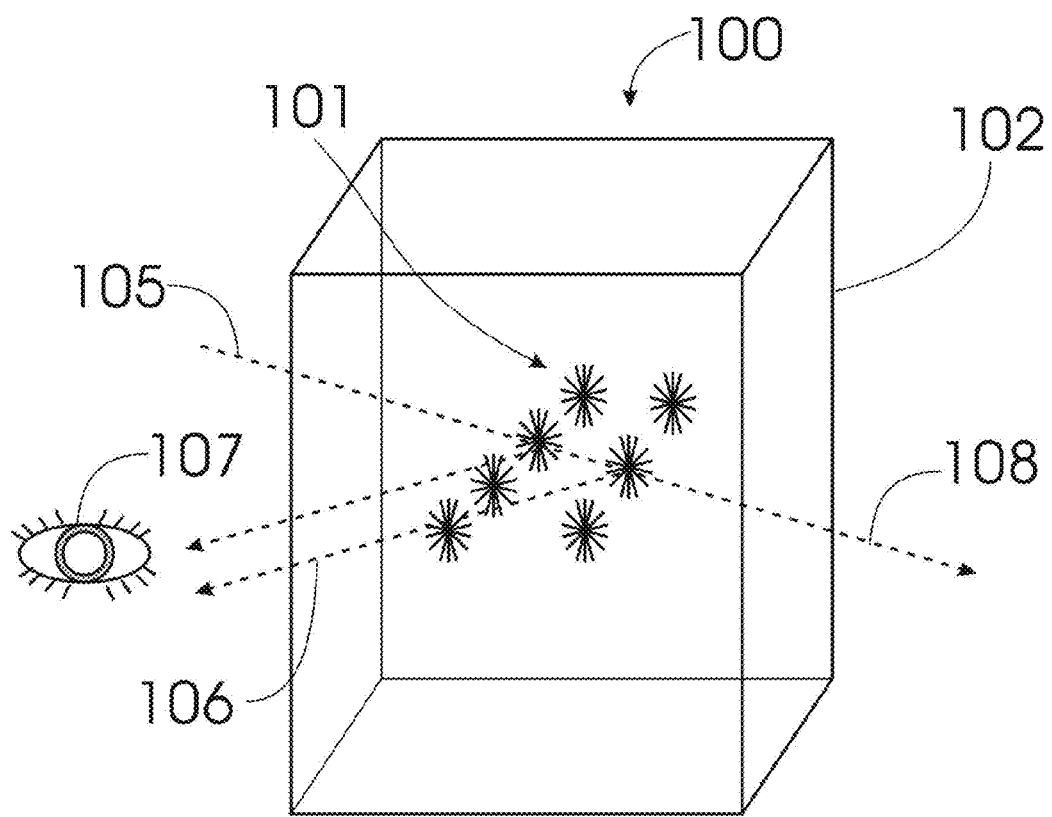
FIG. 1 is a schematic, perspective illustration of a subsurface object within a glass block with a viewer perceiving an image of the subsurface object through side scattering.

With reference to the drawing figures, FIG. 1 depicts an optical device 100 in which a number of subsurface objects or structures 101 have been formed in a block of glass 102. The glass block 102 may be a monolithic block of, for instance, fused silica. The size, shape, and material composition of the glass block 102 may vary considerably. The glass block 102 may constitute only one component of the optical instrument 100 through which incoming light 105 passes. Each subsurface object 101 is configured to act as a respective scattering center for the incoming light 105. Collectively, the subsurface objects 101 form a visible image that appears embedded in the glass block 102.

A ray of the incoming light 105 is shown to depict how the subsurface objects 101 act as scattering centers within the glass block 102. The incoming light ray 105 illuminates at least two of the subsurface objects 101 in this case. As a result, multiple rays 106 are scattered away toward an observer 107. In this way, some of the subsurface objects 101 cause an image of the ray of the incoming light 105 to appear to the observer 107 to be embedded in the glass block 102. The observer 107 may be an individual using the optical device 100 or an optical detector or other device configured and positioned to collect the scattering light rays 106. In some cases, a portion of the incoming light 105 is not scattered by one of the subsurface objects 101, in which case a ray 108 may pass through the glass block 102 as shown without any scattering or diversion. If the scattering fails to occur, then the observer 107 does not see or detect the corresponding subsurface object 101. Several aspects of the disclosure are directed to ensuring that the subsurface objects 101 cause such scattering or diversion to indeed occur so that an image of the incoming light (or lack thereof) is discernable by a user of a weapon sight. However, as described below, in the case of a reticle, the observer is positioned such that the scattering diverts the incoming light from reaching the observer. As a result, a darker image is created that appears to the observer as an absence of incoming light from the reticle.

The disclosed fabrication methods generally use ultrashort laser pulses to create the subsurface objects 101, which are shown generically in FIG. 1 as star-shaped objects or marks for ease in illustration. The outline or shape of each object or mark, or of any collection or arrangement of objects or marks may vary as desired. Ultrashort laser pulses are capable of creating objects or marks of any desired shape with finer details than those made possible with other types of lasers, such as nanosecond lasers. The ultrashort laser pulses can create well-defined features, with sharp edges, which may be useful for most weapon sight applications of the disclosed reticles.

The ultrashort pulses interact with the glass block 102 via non-linear absorption to form or embed the objects 101 within the glass block 102. Despite the embedded or subsurface nature of the objects 101, the glass block 102 constitutes a single, monolithic structure. Each object 101 may be written in the bulk of the glass block 102 as one or more localized regions of modified refractive index. The index modification may involve a change in the index of the glass material, or a change resulting from the discontinuity of a transition between the glass material and a void (e.g., a micro-crack or micro-bubble). The shape, content (e.g., void or glass), and other characteristics of the region(s) determine the optical functionality of the object 101. In some cases, the regions may be formed to act as scattering centers, while in other cases the regions may be formed to act as a waveguides. Either way, the refractive index modifications may be obtained via the direct-write, non-linear absorption processing with ultrafast pulsed, or femtosecond, lasers (e.g., lasers with pulses below 1 picosecond in duration). In some cases, the index modifications underlying the formation of scattering centers and other intrinsic objects described herein may be created using lasers with pulses in the picosecond range. Further details regarding index change modifications in the context of waveguide formation are set forth in U.S. Pat. Nos. 6,768,850 ("Method of index trimming a waveguide and apparatus formed of same"), 7,294,454 ("Waveguide fabrication methods and devices"), and 7,391,947 ("Waveguide fabrication methods and devices"), the disclosures of which are hereby incorporated by reference. Lasers suitable for generating ultrashort pulses are generally available from a number of companies and other sources, including Coherent, Inc. (Santa Clara, Calif.) under the trade name "RegA" and Spectra Physics (Mountain View, Calif.) under the trade name "Tsunami." Such ultrafast pulsed lasers can typically achieve pulse widths of less than 100 femtoseconds. Direct-writing within the glass block 102 of glass regions of modified refractive index may be achieved with pulse energies of on the order of nano-Joules to several micro-Joules depending on the pulse widths as well as focusing optics, while slightly higher energies (e.g., on the order of a few micro-Joules) are used to create void-based index change regions.

The intrinsic region(s) of modified refractive index that make up each object 101 may be configured to form a waveguide segment or track. That is, the shape of the region(s), either individually or collectively, may result in a guiding of the incoming light 105 to divert the light away from the observer. In other cases, a scattering center is instead created to divert the light from its incoming path. Examples of both types of intrinsic objects are described below.

The objects or structures formed within the glass block 102 may be referred to herein as "intrinsic" to distinguish the structures from optical elements that are formed via doping (e.g., ion implantation, diffusion), material removal (e.g., ablation to create a channel waveguide), material deposition (e.g., epitaxial layering), or other introduction or addition of extrinsic material. While these fabrication processes may also result in a monolithic structure like the glass block 102, the monolithic nature of the block 102 differs in that the substance or material of each intrinsic waveguide has a common chemical composition with the remainder of the bulk in which the structure is formed. Indeed, the glass block 102 may have a uniform chemical composition, such that the surrounding bulk of the block 102 has the same chemical composition as the regions within the block 102 that correspond with the waveguides. That is, each region within the block 102 other than a void has a common, uniform chemical composition, such that the refractive index is the defining factor between the intrinsic objects or structures and the surrounding bulk of the block 102. In some cases, the composition of the glass block 102 may deviate from pure glass. In such cases, however, the composition may remain uniform throughout the bulk of the block 102, which includes compositions that are effectively uniform, in the sense that any gradient in the composition profile is either unintended, ancillary to, or not determinative or definitive of any photonic characteristics of a device or component of the block 102. Thus, the term "glass" is used herein broadly to include $SiO_2$ without any impurities, as well as fused silica or other glasses that may have trace or larger amounts of impurities.

The intrinsic, embedded disposition of the objects in the glass block 102 make the disclosed reticles and optical instruments well suited for application and operation in demanding or harsh environments and other field uses. For instance, the interior disposition avoids any complications arising from surface exposure to the environment or from manufacturing techniques (e.g., bonding) used to avoid exposure. Moreover, using fused silica or other glass as the material of both the substrate and the subsurface objects formed therein provides several advantages, including high thermal and vibration stability.

Figure 2:
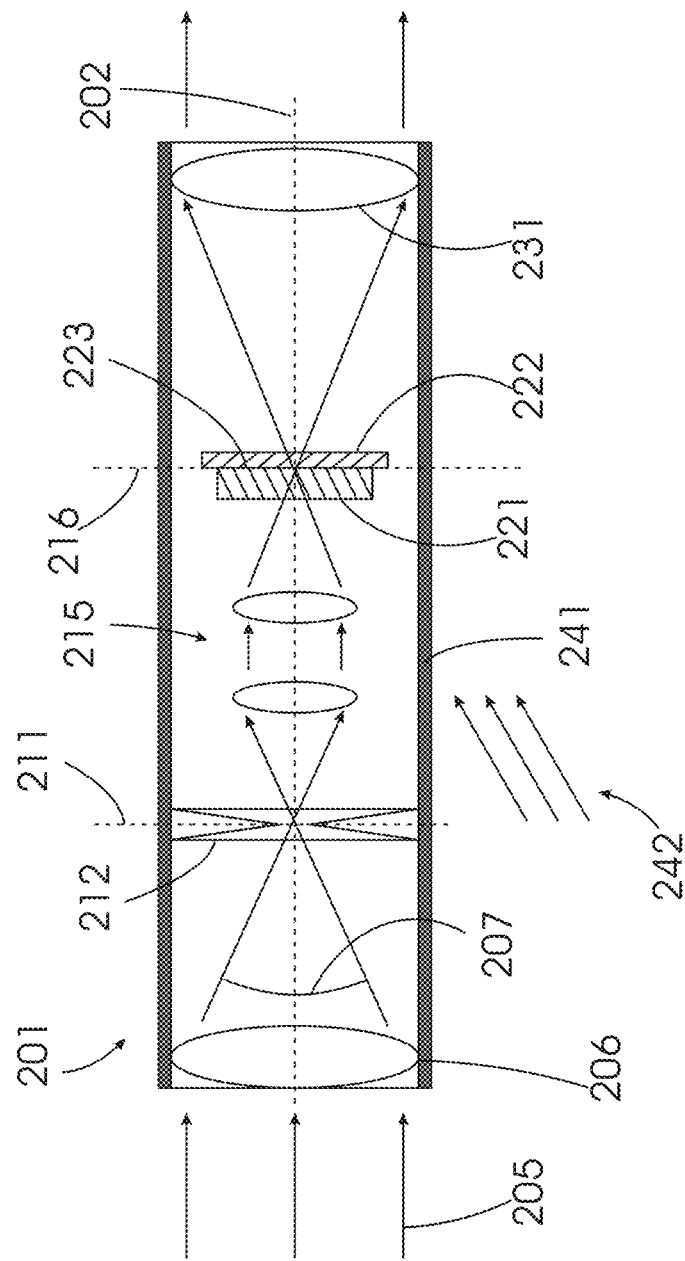
FIG. 2 is a schematic illustration of a telescope sight with a standard reticle but into which a reticle constructed in accordance with one or more aspects of the disclosure may be incorporated.

FIG. 2 is a schematic illustration of an exemplary telescope sight 201 with an optical axis 202. Incoming light 205 enters through an objective assembly 206, and is then focused with, e.g., a defined numerical aperture 207, onto a first focal plane 211. The focal plane 211 may contain an aperture 212. The image of the incoming light 205 may be further relayed through intermediary optics 215 onto a second focal plane 216 that contains a reticle. In this illustration, the reticle is schematically shown as being composed of two substrates or plates 221 and 222, as is often the case with existing reticles. The reticle pattern is located at the common interface 223 between the two plates 221, 222. The light is then relayed through an ocular device or eyepiece 231 toward the observer. A non-transparent telescope shell or enclosure 241 prevents side-illumination 242 from reaching the reticle or otherwise being redirected toward the observer, but has an opening through which the incoming light 205 passes to propagate along the axis 202. Each of the optical instruments disclosed herein may have a shell or other enclosure that houses the optical elements of the instruments and helps to control the light that reaches the observer or user.

Described below are a number of reticles fabricated and configured in accordance with the disclosure and well-suited for incorporation into the telescope sight 201 in substitution of the two plates 221, 222.

Figure 3:
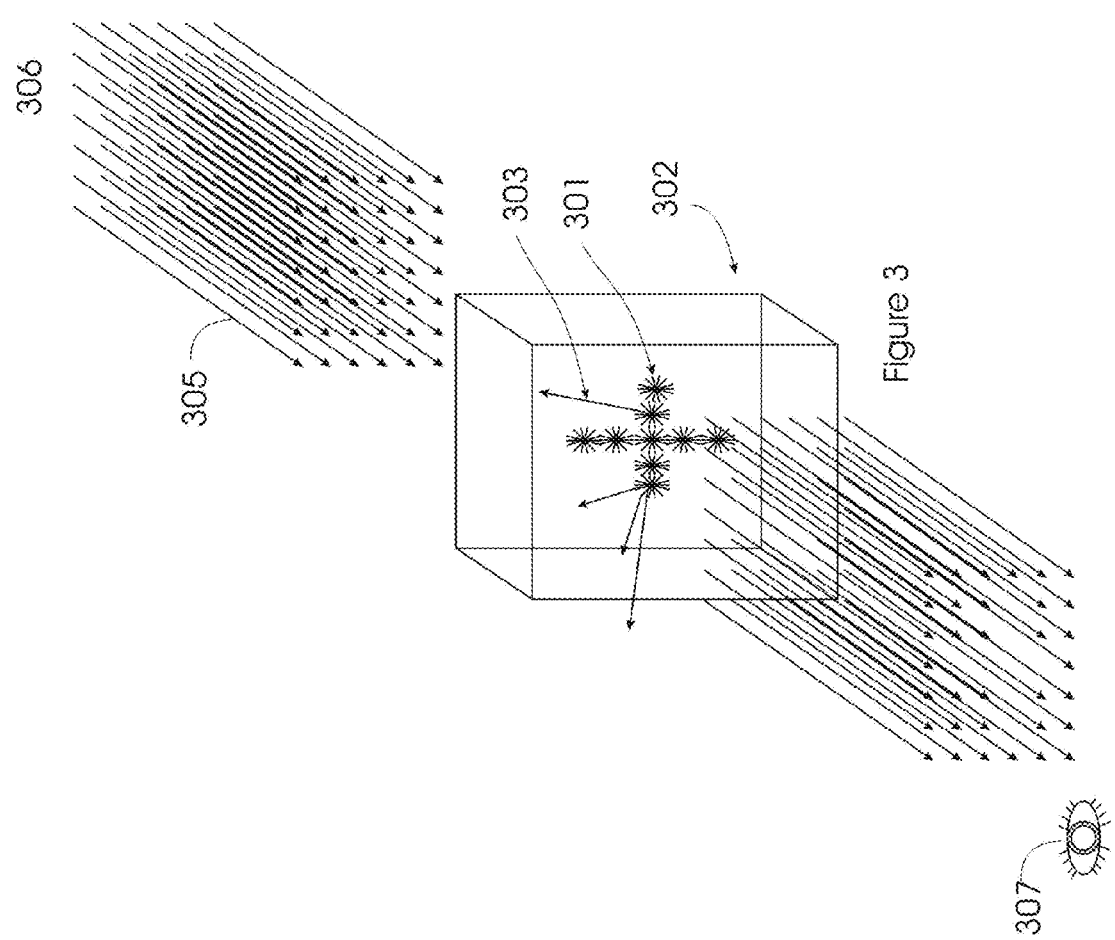
FIG. 3 is a schematic, perspective illustration of an arrangement of subsurface object marks formed within a glass block via an ultrafast laser fabrication process in accordance with one or more aspects of the disclosure for creation of an image embedded in glass through scattering from the object marks.

FIG. 3 depicts an exemplary arrangement of reticle or other object marks 301 in a block of glass 302. In this case, each object mark 301 acts as a scattering center. The scattering centers 301 are generally arranged in a pattern or signature to form the shape of a reticle. In this example, the reticle pattern is a cross shape. Incoming light beams 305 from a distant object 306 are prevented from reaching an observer 307 due to scattering or diversion by the scattering centers 301. The scattering centers 301 illuminated by the incoming light 305 deflect light beams 303 away form the observer, causing the observer to see a non-illuminated (e.g., dark) image of the scattering centers 301 in the shape of the reticle.

Figure 4:
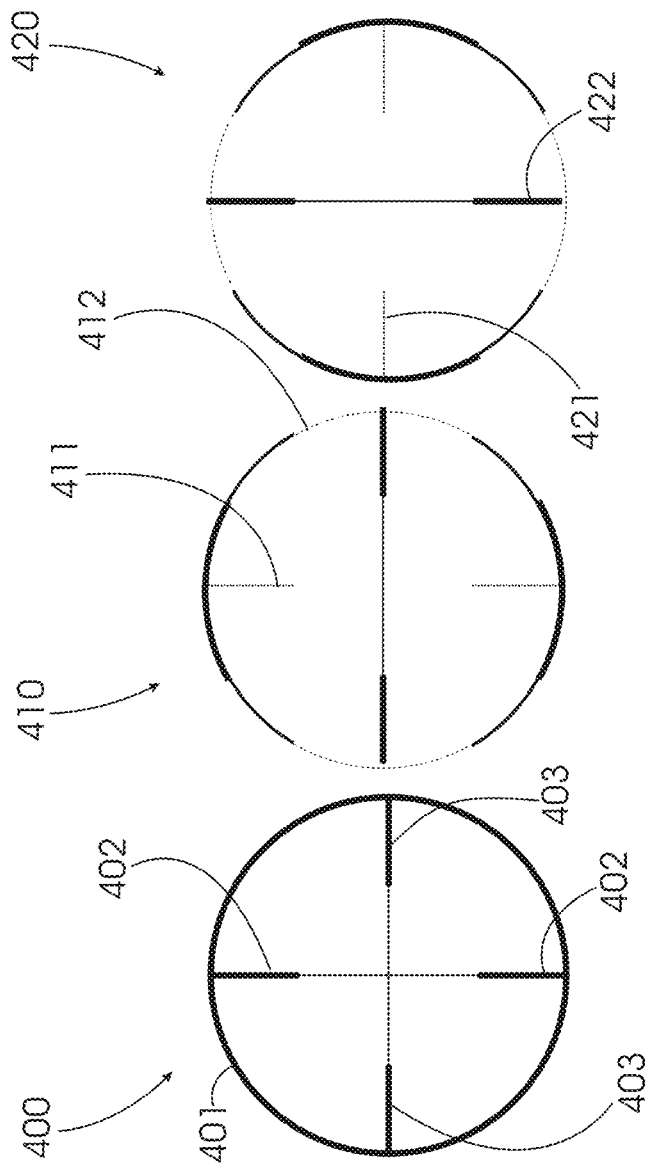
FIGS. 4A-4C show the appearance of an exemplary subsurface reticle object under various illumination conditions when the reticle object is not fabricated or configured in accordance with the teachings of the disclosure.

FIG. 4A depicts an exemplary reticle pattern 400 that may be formed by an arrangement of scattering centers or other object marks in accordance with the disclosure. The pattern 400 is also well suited for exhibiting how the nature of the incoming light for a sight reticle can obscure portions of the pattern 400. In this example, the reticle pattern 400 has an outside circle 401 and pairs of vertical cross lines 402 and horizontal lines 403. In FIG. 4A, the reticle pattern 400 is shown if the reticle is fabricated and configured in accordance with the disclosure. More generally, the reticle pattern 400 may also appear as shown in FIG. 4A if the instrument is illuminated by unpolarized light. As described below, correct images of the disclosed reticles are generated regardless of the polarization state of the incoming light.

FIGS. 4B and 4C depict examples of incorrect images of the reticle pattern of FIG. 4A as a result of polarized light illuminating a reticle not fabricated or configured in accordance with the disclosure. In FIG. 4B, the reticle appears as an image pattern 410 in which the visibility of vertical lines 411 is dramatically reduced, if not eliminated. Portions 412 of the outside circle are also partially non-visible. In FIG. 4C, the same reticle appears as an image pattern 420 when illuminated by a different polarized light (e.g., polarization state S versus polarization state P). Under this illumination condition, different portions of the outside circle are lost (relative to the image of FIG. 4B), and the visibility of horizontal lines 421 is reduced or eliminated, while vertical lines 422 are clearly visible.

In order to avoid such incorrect images of the reticle pattern, the disclosed reticles are configured to ensure or increase the amount of light scattered or diverted by the subsurface objects or marks created by the writing laser. Substantial or sufficient scattering or diversion occurs regardless of the extent to which the incoming light is polarized, and regardless of the polarization state of the incoming light. The scattering or diversion also occurs despite the fine nature of the objects resulting from the writing laser.

In accordance with one aspect of the disclosure, the fabrication process includes writing or creating multiple scattering layers stacked against the incoming light. Thus, in some cases, each subsurface mark or object includes a plurality of scattering layers, each of which is oriented transverse or perpendicular to the incoming light for successive illumination. A set or arrangement of such multilayered marks may then be used to form a desired reticle pattern. The set or arrangement may include any number of densely packed marks or objects, each of which acts as a scattering center to divert the light from an observer. As described below, the density of each scattering center may be adjusted (e.g., increased) by forming each scattering layer of a mark from an array or group of closely spaced, side-by-side (i.e., parallel) intrinsic traces or tracks of modified refractive index. The spacing between the traces or tracks may be decreased to improve the density of each scattering layer (or center), ranging, for instance, from about 0.5 microns to about 1.5 microns. The density of each scattering center may also be adjusted by introducing discontinuities or breaks along the length of each intrinsic trace or track.

Figure 5:
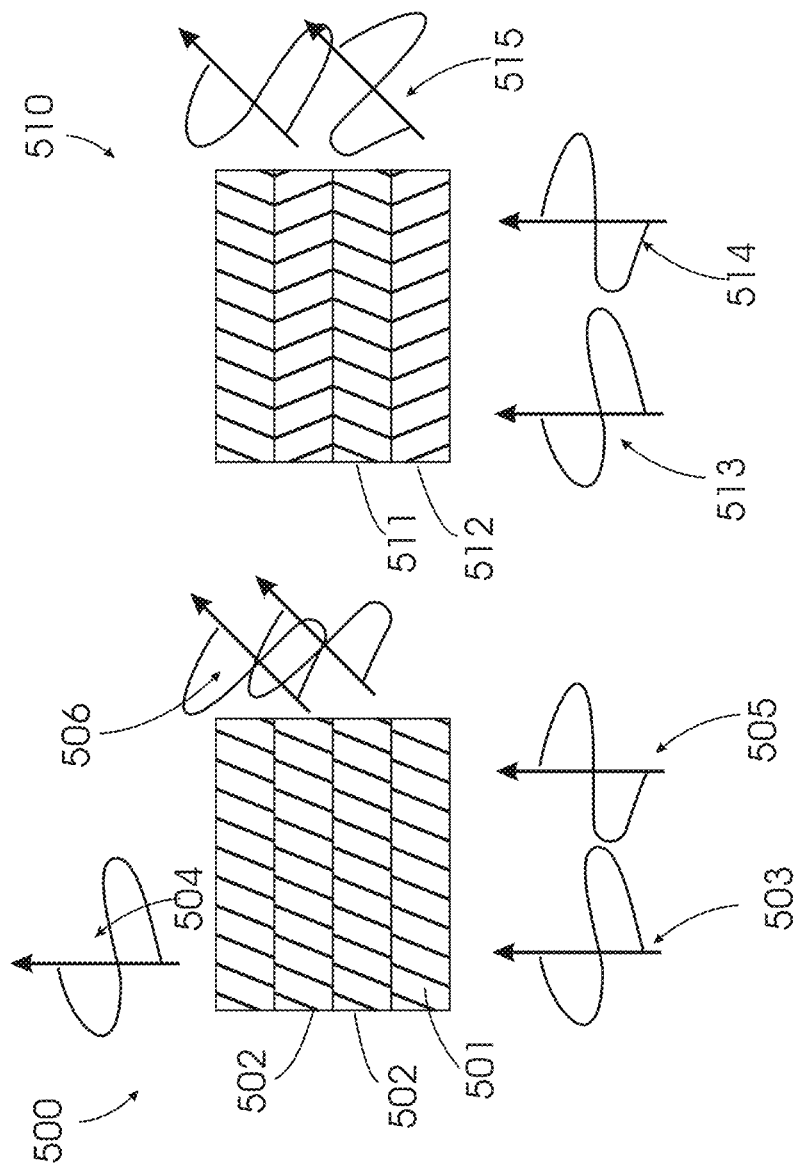
FIG. 5A is a schematic illustration of a subsurface object mark or scattering center in which multiple scattering layers are fabricated in a stacked formation, with each layer having the same polarization effect.
FIG. 5B is a schematic illustration of an exemplary subsurface object mark or scattering center constructed in accordance with an embodiment in which multiple scattering layers are fabricated in a stacked formation, with respective layers having different polarization effects to scatter or divert the incoming light regardless of its polarization state.

FIG. 5A depicts one example of a simplified reticle 500 illustrated in schematic form to highlight the multi-layer and track-based characteristics of this aspect of the disclosure. The reticle 500 includes a number of traces or tracks 501 intrinsically formed within a glass block and arranged in one of four layers 502. Each trace or track 501 may correspond with a region of modified refractive index, e.g., a microcrack or other void, within the glass block that acts as a scattering center as described above in connection with FIG. 1. Each trace or track 501, and thus, each layer 502, may be oriented transverse or perpendicular to incoming light 503 to promote deflection or other scattering or diversion from the main optical path of the incoming light 503. Each layer 502 may include a desired number of the traces or tracks 501 disposed side-by-side in parallel to obtain a desired density or depth for the layer 502. Each layer 502 is schematically shown in FIG. 5A with cross-hatching, which may be indicative of an operational characteristic of the group of traces or tracks 501. The illustration of the reticle 500 is also schematically simplified in the sense that only a single scattering center is shown (rather than the entire reticle pattern or signature). Further scattering centers may be disposed at either side of, above, or below, the scattering center shown. Moreover, while the scattering center has a depth of four scattering layers relative to the incoming light 503, the depth of the scattering center may vary from the example shown. The spacing between adjacent traces 501 may be adjusted, and the number of layers 502 may also may vary considerably to a select a desired depth. The other dimensions of the scattering center generally correspond with the desired dimensions of the reticle or object mark.

Despite the depth and density of the reticle 500 arising from the multiplicity of traces 501 in each layer 502, and the stacking of the layers 502, the reticle 500 may not operate as intended under certain operational conditions. As a default, each track 501 has a polarization dependence that is a function of the writing laser beam polarization. If the incoming light 503 is fully or partially polarized, and each layer 502 has the same polarization response or effect on the incoming light 503, then a portion 504 of the incoming light 503 will not be strongly scattered by the any of layers 502. As shown, the portion 504 has a first polarization state that is allowed to travel through the scattering center to reach an observer. As a result, the reticle 500 is not visible to the observer under that condition. In contrast, the polarization response or effect of each layer 502 does not allow incoming light 505 of a different polarization to pass through, deflecting or otherwise diverting it from the observer as scattered light 506. Thus, an image of the reticle 500 is visible to the observer if all of the incoming light has the polarization state of the light 505, but is not necessarily visible (or only partially visible) if the incoming light is otherwise polarized. Each of the layers 502 is schematically depicted as having the same polarization response via cross-hatching angled in the same direction.

FIG. 5B depicts an exemplary reticle 510 having at least two different scattering layer configurations, schematically indicated via different cross-hatching. While the reticle 510 is similar in many respects (total number of layers, track spacing, etc.) to the reticle 500 (FIG. 5A), the scattering layers of the reticle 510 do not all have the same polarization response or effect on the incoming light. As described below, the polarization of the writing laser is varied to eliminate the polarization dependence that would otherwise result for the scattering center or reticle. In this example, a scattering layer 511 has a different polarization effect than a scattering layer 512. As a result, incoming polarized light 513 and incoming light 514 of a different polarization state than the light 513 are both strongly deflected or otherwise diverted into scattered light 515 by the reticle 510. The other scattering layers of the scattering center may provide yet further polarization response differentiation. Thus, in some cases, the scattering layers may present any desired number of different scattering layer configurations.

In accordance with one aspect of the disclosure, the variance in polarization responses is the result of selecting or controlling the polarization of the ultrashort laser pulses while writing the traces or tracks of the scattering layer. For example, the polarization of the writing laser is set to a first polarization state (e.g., P-polarization) while the traces of the scattering layer 511 are being written, and then set to a second polarization state (e.g., S-polarization) while the traces of the scattering layer 512 are being written. Generally speaking, the polarization of the writing laser causes the region of modified refractive index to exhibit a polarization preference. The writing laser polarization may create subwavelength or grating-like patterns in the scattering centers, the orientation of which is a function of the writing laser polarization. In this way, the writing laser polarization is selected and varied to control the scattering polarization dependence (or effect) of each layer of the scattering center and, as a result, eliminate the polarization dependence of the scattering center(s).

The polarization dependence of each scattering center can be eliminated or dramatically reduced if the writing laser polarization is varied over the course of fabricating the multi-layer structure. In the example of FIG. 5B, one trace or layer is written with one polarization, and the next trace or layer is written with an alternate polarization. While the multiple layers generally provide an opportunity to vary the writing polarization and, thus, the polarization dependence of the scattering center, the polarization need not be varied solely on a layer-by-layer, or trace-to-trace, basis. Alternatively or additionally, the polarization of the writing laser may be modified within a single trace. In each case, the polarization may be modified in a continuous manner, in discrete, regular steps, or randomly.

Varying the writing laser polarization may avoid or control the formation of thick gratings, which can be formed when maintaining a well-defined writing polarization. The formation of gratings may be highly undesirable, insofar as the grating will diffract different incoming wavelengths into different directions with different efficiencies. Varying the spacing between the traces may also help to avoid such ineffective scattering. However, such wavelength-sensitive scattering or diffraction may be useful in some applications.

Each intrinsic trace or track of the scattering centers of FIGS. 5A and 5B may be generally configured as an intrinsic region of modified refractive index to act as an individual scattering center to divert the incoming light from the main optical axis of the optical instrument. Alternatively, the set of side-by-side or parallel traces or tracks of each scattering layer may be considered as a single scattering center with the set of traces acting collectively.

Figure 6:
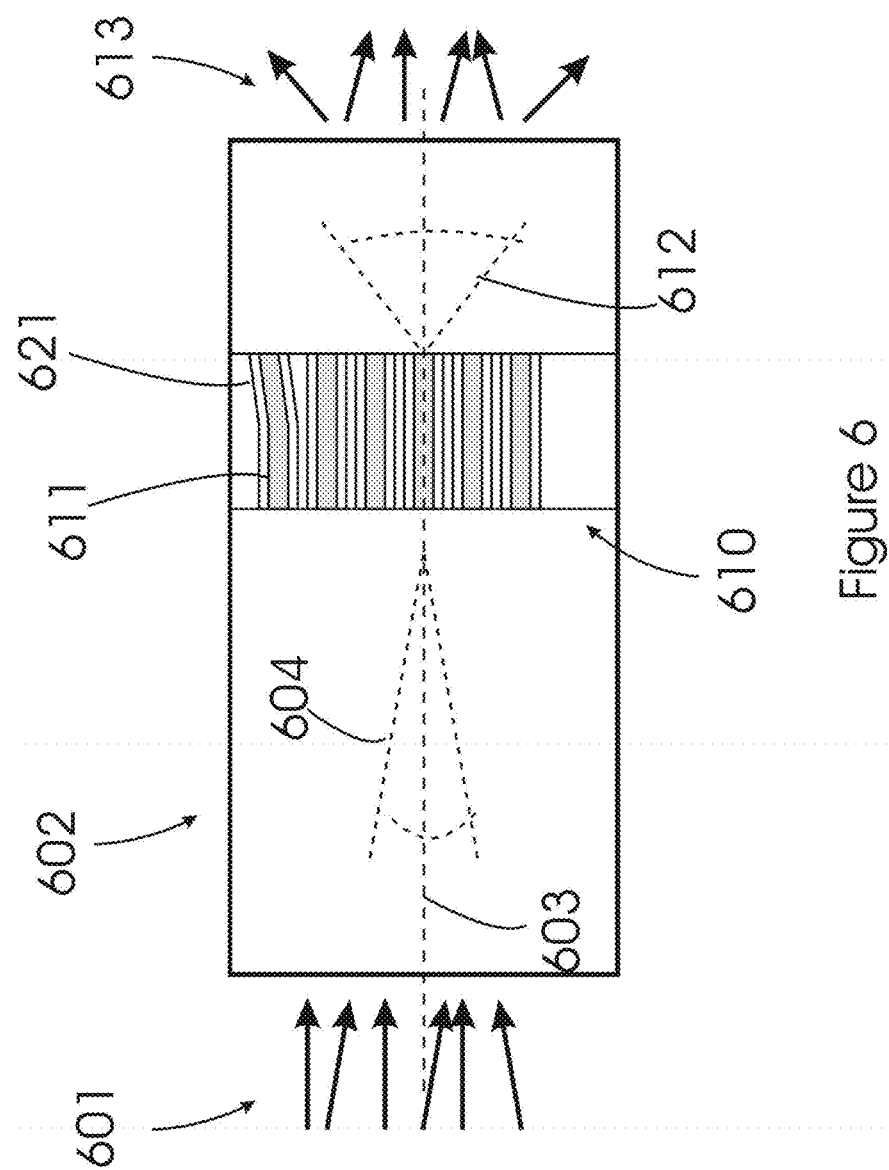
FIG. 6 is a schematic illustration of another exemplary subsurface object mark constructed in accordance with an embodiment in which an array of waveguides is arranged to form at least part of a reticle pattern by diverting the incoming light.

FIG. 6 shows another example of an object mark that diverts the incoming light from the principal optical axis. In this case, the intrinsic regions of modified refractive index are aligned with the optical axis to encourage the incoming light to be captured and guided by a waveguide. Rather than use a scattering center to divert light, the waveguide array in this case is configured to diffuse light away from an observer to form an image of a reticle or other object pattern. In this example, incoming light 601 enters an instrument 602 with a main optical axis 603 and an objective assembly or other optical element having a small numerical aperture 604. The incoming light 601 gives rise to an optical signal that propagates through the instrument 602 until it reaches one or more arrays 610 of intrinsic waveguides 611, each of which has a numerical aperture 612 larger than the numerical aperture of the instrument 602. Each waveguide array 610 may form a portion of the object pattern. Taken together, the collection of waveguide arrays 610 are arranged to present the desired reticle shape. To these ends, the input end of each waveguide is disposed at a respective position in the object pattern. The waveguide arrays 610 may then be arranged side-by-side to provide a desired object dimension (height or width).

Each waveguide 611 has a main propagation axis oriented in parallel with the principal optical axis of the incoming light and, thus, with the axes of the other waveguides 611, which together generally run side-by-side from the input end to an output end. The light exits each waveguide array 610 at the output end in a broader pattern 613 representative of the numerical aperture 612 of the waveguide array 610. Thus, the direct, on-axis intensity is reduced when the incoming light 601 passes through the waveguide array 610. As a result, an image of the object pattern is visible to an observer. This effect can be reinforced if a tip 621 at the output end of some or all of the waveguides 611 in the arrays 610 is bent outward, or away from the main optical axis 603, thereby guiding and further redirecting light away from the main optical axis 603. To insure that the outgoing light diverges strongly, the waveguides 611 may be multimode, and the waveguides 611 may be configured to scramble the modes via, for instance, changing the cross-sectional shape or size of the waveguide, and controlling the symmetry of the waveguide.

In order to further enhance the visibility or contrast of the reticle (or other object), an optical instrument may include both the waveguide array(s) and an arrangement of multi-layered, high-density, scattering centers to divert the incoming light. In this approach, the optical waveguide function is to diffuse or direct away from the viewer any light that may not have been scattered away by the multilayered, high-density, scattering centers. The optical waveguides array(s) may also be shaped in the form of the desired reticle or other object pattern.

Turning to FIG. 7, an example of the combination of scattering centers and waveguide diffusers is shown. An optical instrument 701 with an optical axis 702 includes an intrinsic multilayered scattering structure 711 and multiple layers of arrays 712 of intrinsic waveguides. Incoming light 721 is mostly scattered away by the scattering centers of the structure 711. Any remaining light 722 still propagating along the optical axis 702 is then diffused and further weakened by the waveguide array(s) 712.

With reference to FIG. 8, one or more of the scattering layers may be configured for sight illumination to support night operation of an optical instrument. During night operation, the surrounding light is very weak. For example, an object to be viewed through a weapon sight may be visible (likely through an enhanced night vision technique), but there may not be sufficient light to see the reticle. In this case, a small light source may be integrated within the optical instrument and used for side-illumination of the reticle. To this end, one or more layers of a reticle may be configured to deflect a desired amount of the light from the light source toward the observer. In some cases, the layer(s) may be configured to deflect only a portion of the light from the light source, insofar as too much light may be just as detrimental to the use of the optical instrument as too little light. One way in which partial deflection is achieved is via discontinuities in the scattering centers, e.g., breaks in the transverse traces or tracks of the scatter layers. The layer(s) may alternatively or additionally have a spatially defined pattern scattering the side emitted light toward the observer that corresponds with the pattern or shape of the reticle. Alternatively, the layer(s) may introduce the light more comprehensively along the principal optical axis, in which case the object marks of the reticle divert the light as described above to provide a contrasting image of the reticle pattern. More generally, the layer(s) may be integrated into a stack of scattering layers of a reticle, optimized for side illumination, and generally disposed within or near the other layers forming the reticle.

The exemplary instrument shown in FIG. 8 has a reticle 801 with multiple layers 802 configured to scatter incoming light 803 in accordance with the reticle pattern and without polarization dependence as described above. A layer 811 also includes a set of intrinsic objects, each of which is configured to scatter light from a side source 812 toward an observer 813. The layer 811 may be designed to scatter light throughout uniformly through the layer, or only at well-defined location(s). In the latter case, the set of intrinsic objects may be arranged in accordance with the reticle pattern.

As shown in the examples of FIGS. 7 and 8, the stacks of scattering layers, waveguide arrays, and other intrinsic elements within the glass block need not be contiguous. Layers may be separated from an adjacent layer to a desired extent, either by unmodified bulk glass or an intervening optical element. However, the layers and other intrinsic elements may be positioned in close proximity so as to remain within the same focal plane of the optical instrument.

Described above are optical instruments and fabrication methods in which a reticle or other object pattern is formed by creating small, dense, scattering sites in a block of glass material. The glass material may be fused silica, fused quartz, or any other glass showing no significant color centers formation when exposed to intense light. The reticle object may include many scattering layers to ensure that the image of the reticle is visible to an observer (e.g., dark rather than light). Because the reticle is designed to be viewed on axis, the scattering layers include sets or arrays of intrinsic objects configured to block on-axis light. The reticle may be included within an optical instrument with a small numerical aperture. Because the scattering associated with each layer may exhibit polarization dependence, the scattering resulting from a combination of multiple layers exhibits no polarization dependence and, thus, effective scattering for all operational conditions.

As described above, each scattering layer may include multiple parallel tracks. Even though each scattering track may have a polarization response, the overall scattering center is configured such that no polarization dependence is exhibited. Each layer of tracks is fabricated using a femtosecond laser to create intrinsic objects within the glass block.

The polarization of the laser is then selected to control the scattering polarization dependence of each layer or track.

As an alternative or additional approach to diverting the on-axis light, the disclosed reticles may use an array of waveguides to diffuse the light away from the optical instrument principal axis.

As described above, one or more scattering layers may be configured to optimize side illumination for night operation. The layer(s) may be formed within or near the other layers forming the reticle. Alternatively or additionally, the layer(s) may have a spatially defined pattern scattering the side emitted light towards the user.

In each of the foregoing embodiments, the scattering layers and other intrinsic objects do not have to be flat. One or more layers of each optical instrument may be written in or along a non-flat surface in order to compensate for optical aberrations present in the optical instrument, or more generally to introduce one or more desired optical effects. Similarly, each waveguide array or layer need not present a flat front surface. In some cases, the input ends of the waveguides in the array may instead present a curved front surface for the incoming light.

With the ultrafast laser writing technique of the disclosed methods, the scattering layers and other intrinsic objects need not be written in substrates having flat outer surfaces. The scattering centers, waveguide array diffusers, and other intrinsic elements may be written in non-flat glass volumes, such as a spherical lens, a cylindrical lens, a prism, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An optical instrument for light incoming along a principal optical axis, the optical instrument comprising:
   a glass block; and
   a subsurface object within the glass block, the subsurface object including an arrangement of object marks;
   wherein each object mark includes a plurality of scattering layers stacked against the principal optical axis of the incoming light,
   wherein first and second scattering layers of the plurality of scattering layers have different polarization responses such that a complete image of each object mark is generated regardless of an extent to which the light is polarized,
   wherein each scattering layer includes a set of parallel intrinsic scattering tracks, and
   wherein first and second intrinsic scattering tracks of the set of parallel intrinsic scattering tracks for a respective one of the scattering layers have different scattering polarization effects.

2. The optical instrument of claim 1, wherein each scattering layer includes a set of parallel intrinsic scattering tracks, each intrinsic scattering track being oriented transverse to the principal optical axis and exhibiting a polarization dependence.

3. The optical instrument of claim 1, further comprising an array of intrinsic waveguides disposed within the glass block, the array being configured to diffuse any light not scattered by the plurality of scattering layers.

4. The optical instrument of claim 1, wherein the subsurface object is disposed along a non-flat three-dimensional curve within the glass block.

5. The optical instrument of claim 1, wherein the glass block has a non-flat surface through which the light passes.

6. The optical instrument of claim 1, further comprising a shell enclosing the glass block.

7. The optical instrument of claim 6, further comprising a light source configured to introduce side-illumination within the shell and an illumination scattering layer disposed within the glass block and positioned to redirect the side-illumination from the light source along the principal optical axis.

8. The optical instrument of claim 7, wherein the illumination scattering layer has a spatially defined pattern that corresponds with the arrangement of object marks.

9. The optical instrument of claim 7, wherein the illumination scattering layer includes a set of intrinsic scattering tracks, at least one of which includes discontinuities to reduce a density of the scattering layer.

10. The optical instrument of claim 1, wherein the arrangement of object marks forms a reticle.

11. An optical instrument for light incoming along a principal optical axis, the optical instrument comprising:
    a glass block; and
    a subsurface object within the glass block, the subsurface object including an arrangement of object marks;
    wherein each object mark includes a plurality of scattering layers stacked against the principal optical axis of the incoming light,
    wherein first and second scattering layers of the plurality of scattering layers have different polarization responses such that a complete image of each object mark is generated regardless of an extent to which the light is polarized,
    wherein each scattering layer includes a set of parallel intrinsic scattering tracks; and
    wherein a scattering polarization effect of a respective intrinsic scattering track of the set of parallel intrinsic scattering tracks for a respective one of the scattering layers is varied within the respective intrinsic scattering track.

12. The optical instrument of claim 11, wherein the scattering polarization effect varies in a continuous manner.

13. The optical instrument of claim 11, wherein the scattering polarization effect varies in discrete steps.

14. The optical instrument of claim 11, wherein the scattering polarization effect varies randomly.

15. The optical instrument of claim 11, further comprising an array of intrinsic waveguides disposed within the glass block, the array being configured to diffuse any light not scattered by the plurality of scattering layers.

16. The optical instrument of claim 11, wherein the subsurface object is disposed along a non-flat three-dimensional curve within the glass block.

17. The optical instrument of claim 11, further comprising:
    a shell enclosing the glass block; and
    a light source configured to introduce side-illumination within the shell and an illumination scattering layer disposed within the glass block and positioned to redirect the side-illumination from the light source along the principal optical axis.

18. The optical instrument of claim 17, wherein the illumination scattering layer has a spatially defined pattern that corresponds with the arrangement of object marks.

19. The optical instrument of claim 17, wherein the illumination scattering layer includes a set of intrinsic scattering tracks, at least one of which includes discontinuities to reduce a density of the scattering layer.

20. The optical instrument of claim 11, wherein the arrangement of object marks forms a reticle.

* * * * *